US012759491B2

(12) United States Patent
Quast et al.

(10) Patent No.: US 12,759,491 B2
(45) Date of Patent: Oct. 13, 2026

(54) VOICE ASSISTANT OPTIMIZATION DEPENDENT ON VEHICLE OCCUPANCY

(71) Applicant: CERENCE OPERATING COMPANY, Burlington, MA (US)

(72) Inventors: Holger Quast, Ghent (BE); Markus Funk, Merelbeke (BE); Christophe Couvreur, Merelbeke (BE)

(73) Assignee: Cerence Operating Company, Burlington, MA (US)

( * ) Notice: Subject to any disclaimer, the term of this patent is extended or adjusted under 35 U.S.C. 154(b) by 143 days.

(21) Appl. No.: 18/721,972

(22) PCT Filed: Dec. 22, 2022

(86) PCT No.: PCT/US2022/053828

§ 371 (c)(1),
(2) Date: Jun. 20, 2024

(87) PCT Pub. No.: WO2023/122283

PCT Pub. Date: Jun. 29, 2023

(65) Prior Publication Data

US 2025/0058726 A1 Feb. 20, 2025

Related U.S. Application Data

(60) Provisional application No. 63/293,266, filed on Dec. 23, 2021.

(51) Int. Cl.
*B60R 16/037* (2006.01)
*G10L 15/22* (2006.01)

(52) U.S. Cl.
CPC .......... *B60R 16/0373* (2013.01); *G10L 15/22* (2013.01)

(58) Field of Classification Search
CPC ..... B60R 16/0373; G10L 15/22; G10L 25/48; G10L 2015/088; G10L 2015/228
See application file for complete search history.

(56) References Cited

U.S. PATENT DOCUMENTS 9,818,407 B1 * 11/2017 Secker-Walker ....... G10L 25/78
9,940,949 B1 4/2018 Vitaladevuni et al.
(Continued)

FOREIGN PATENT DOCUMENTS

EP 3678135 A1 7/2020
WO 2020072759 A1 4/2020

OTHER PUBLICATIONS

Tsai, TJ, et al., "Multimodal Addressee Detection in Multiparty Dialogue Systems," ICASSP 2015, 5 pages.
(Continued)

*Primary Examiner* — Darioush Agahi
(74) *Attorney, Agent, or Firm* — Brooks Kushman, P.C.

(57) ABSTRACT

A vehicle system for classifying spoken utterance within a vehicle cabin as one of system-directed and non-system directed, the system may include at least one microphone configured to detect at least one audio signal from at least one occupant of a vehicle, and a processor programmed to receive the at least one audio signal including at least one acoustic utterance, determine a number of vehicle occupants based at least in part on the at least one signal, determine a probability that the utterance is system directed based at least in part one the utterance and the number of vehicle occupants, determine a classification threshold based at least in part on the number of vehicle occupants, compare the classification threshold to the probability to determine whether the at least one acoustic utterance is one of a system directed utterance and a non-system directed utterance.

18 Claims, 3 Drawing Sheets

(56) References Cited

U.S. PATENT DOCUMENTS

| | | | | |
|---|---|---|---|---|
| 2014/0200737 | A1 * | 7/2014 | Lortz | B60R 25/25 701/1 |
| 2020/0219493 | A1 * | 7/2020 | Li | G10L 15/22 |
| 2021/0166683 | A1 | 6/2021 | Joh | |
| 2022/0212658 | A1 * | 7/2022 | Nagata | G06V 40/172 |

OTHER PUBLICATIONS

Norouzian, A., et al., "Exploring attention mechanism for acoustic-based classification of speech utterances into system-directed and non-system-directed." Feb. 2019, 5 pages. DOI:10.48550/arXiv:1902.00570.

* cited by examiner

VOICE ASSISTANT OPTIMIZATION DEPENDENT ON VEHICLE OCCUPANCY

CROSS-REFERENCE TO RELATED APPLICATIONS

This application is the U.S. National Phase of PCT Application No. US/2022/053828, filed Dec. 22, 2022, which, in turn, claims the benefit of U.S. provisional application 63/293,266, filed Dec. 23, 2021, the disclosures of which are hereby incorporated in their entirety by reference herein.

FIELD OF INVENTION

Described herein are mechanisms for preventing errors for voice assistant systems.

BACKGROUND

Many systems and applications are presently speech enabled, allowing users to interact with the system via speech (e.g., enabling users to speak commands to the system). Engaging speech-enabled systems often requires users to signal to the system that the user intends to interact with the system via speech. For example, some speech recognition systems may be configured to begin recognizing speech once a manual trigger, such as a button push (e.g., a button of a physical device and/or a button within a speech recognition software application), launch of an application or other manual interaction with the system, is provided to alert the system that speech following the trigger is directed to the system. However, manual triggers complicate the interaction with the speech-enabled system and, in some cases, may be prohibitive (e.g., when the user's hands are otherwise occupied, such as when operating a vehicle, or when the user is too remote from the system to manually engage with the system or an interface thereof).

Some speech-enabled systems allow for voice triggers to be spoken to begin engaging with the system, thus eliminating at least some (if not all) manual actions and facilitating generally hands-free access to the speech-enabled system. Use of a voice trigger may have several benefits, including greater accuracy by deliberately not recognizing speech not directed to the system, a reduced processing cost since only speech intended to be recognized is processed, less intrusive to users by only responding when a user wishes to interact with the system, and/or greater privacy since the system may only transmit or otherwise process speech that was uttered with the intention of the speech being directed to the system.

A voice trigger may comprise a designated word or phrase that is spoken by the user to indicate to the system that the user intends to interact with the system (e.g., to issue one or more commands to the system). Such voice triggers are also referred to herein as a "wake-up word" or "WuW" and refer to both single word triggers and multiple word triggers. Typically, once the wake-up word has been detected, the system begins recognizing subsequent speech spoken by the user. In most cases, unless and until the system detects the wake-up word, the system will assume that the acoustic input received from the environment is not directed to or intended for the system and will not process the acoustic input further. However, requiring WuW may cause unnecessary effort by the users and increase frustration.

SUMMARY

A vehicle system for classifying spoken utterance within a vehicle cabin as one of system-directed and non-system directed, the system may include at least one microphone configured to detect at least one audio signal from at least one occupant of a vehicle, and a processor programmed to receive the at least one audio signal including at least one acoustic utterance, determine a number of vehicle occupants based at least in part on the at least one signal, determine a probability that the utterance is system directed based at least in part one the utterance and the number of vehicle occupants, determine a classification threshold based at least in part on the number of vehicle occupants, compare the classification threshold to the probability to determine whether the at least one acoustic utterance is one of a system directed utterance and a non-system directed utterance.

A vehicle system for classifying spoken utterance within a vehicle cabin as one of system-directed and non-system directed, the system may include at least one sensor configured to detect at least one occupancy signal from at least one occupant of a vehicle, and a processor programmed to receive at least one audio signal from a vehicle microphone, and determine a classification threshold based at least in part on the occupancy signal to apply to a probability that acoustic utterances spoken by at least one of the vehicle occupants is a system directed utterance.

A method for classifying spoken utterance as one of system-directed and non-system directed, the system may include receiving at least one signal indicative of a number of vehicle occupants, receiving at least one utterance from one of the vehicle occupants, identifying the one of the vehicle occupants, determining a probability that the at least one utterance is system directed, determining a classification threshold based at least in part on the number of vehicle occupants and occupant-specific factors associated with the one of the vehicle occupants, and comparing the classification threshold to the probability to determine whether the at least one utterance is one of a system directed utterance and a non-system directed utterance.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompany drawings in which:

DETAILED DESCRIPTION

Figure 1:
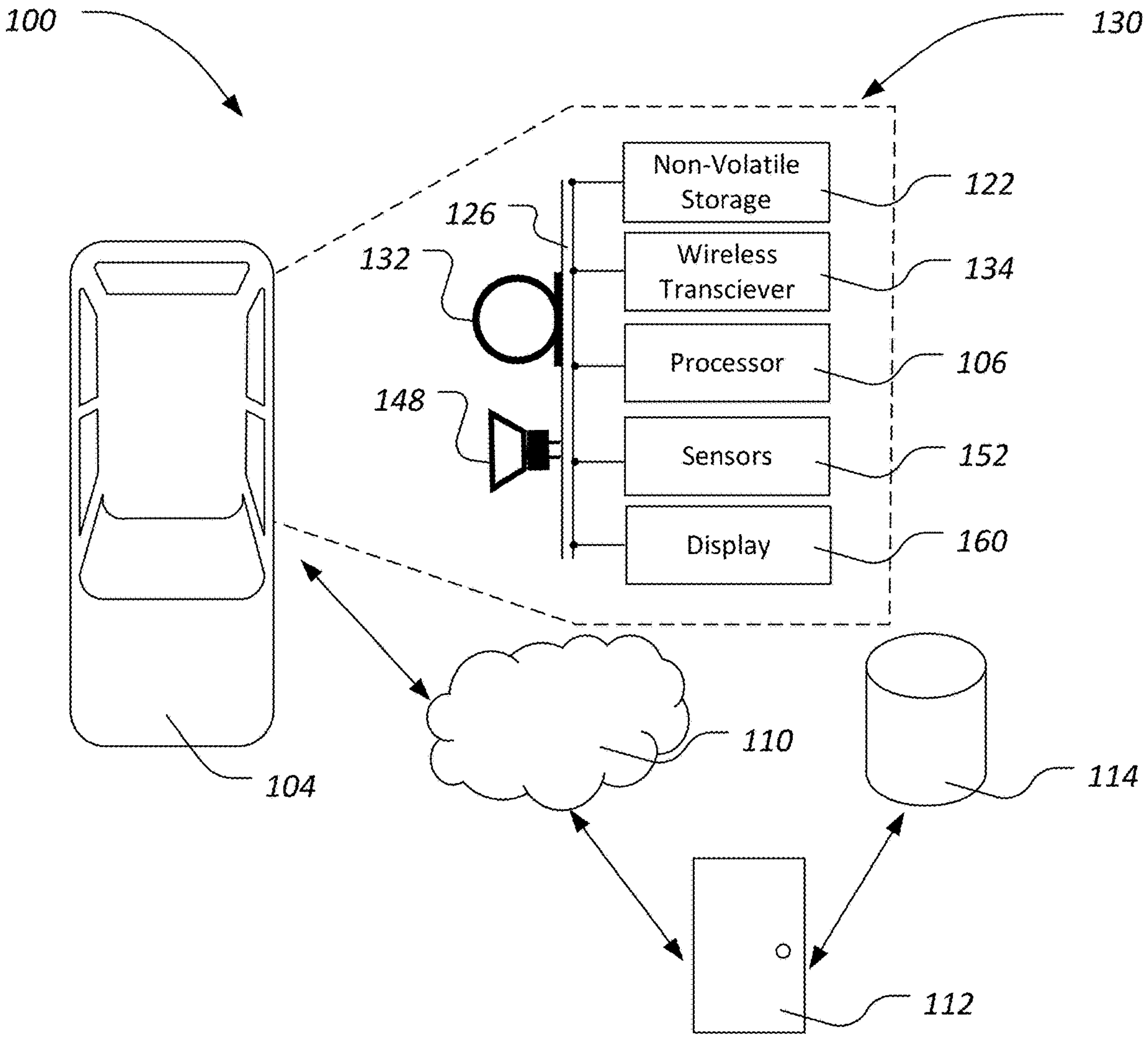
FIG. 1 illustrates a block diagram for a voice assistant system in an automotive application having a multimodal input processing system in accordance with one embodiment.

Voice command systems may analyze spoken commands from users to perform certain functions. For example, in a vehicle, a user may state "turn on the music." This may be understood to be a command to turn on the radio. Such commands are known as system-directed (SD) commands. Other times human speech may be human-to-human conversation and not intended to be a command. These utterances may be known as non-system directed (NSD) utterances. For example, a vehicle user may state "there was a concert last night and I hear the music was nice." However, in some situations, the system may incorrectly classify as SD or NSD. These improper classifications may be referred to as false accepts, where the utterance is incorrectly classified as SD and should have been NSD, or false rejects, where the utterance is incorrectly classified as NSD and should have been SD. Such incorrect classifications may cause frustrations to the user when an SD intended utterance is ignored, as well as when a NSD utterance is misunderstood as a command.

Disclosed herein is an error detection system for determining whether an utterance is a SD utterance, or a NSD utterance. In instances where only one occupant is within the vehicle, it is more likely than not that an utterance is SD. Thus, the classification threshold may be set fairly low. However, when more than one occupant is within the vehicle, the likelihood that an utterance is part of normal conversation between the occupants is greater. In this situation, the classification threshold may be set higher, to avoid false accepts or false rejects of utterances that are human-to-human conversation. The system herein allows for dynamic classification threshold to be set based on the number of occupants within the vehicle. The number of occupants may be detected by vehicle microphones, however, other data may be used to determine the number of occupants within a vehicle, such as seat occupant detection per weight sensors, mobile device detection, in-vehicle camera systems, etc. This allows for a better user experience where single occupant and multiple occupant scenarios are treated differently. In situations where multiple occupants are within the vehicle, prior to activating a voice assistant, the system may for instance assess that the utterance is SD by setting a higher threshold to accept the utterance as SD.

Further, thresholds may be set according to other occupancy related factors. A natural and user-friendly system behavior depends on many factors including various ones related to vehicle occupancy. Occupancy related measures can help determine whether an utterance is SD or NSD. Occupancy related measures may also have an impact on the cost to the user experience that is caused by false accept (FA) or False reject (FR) errors. In the method presented herein, it is shown how occupancy related factors therefore contribute to estimating the probability that an utterance is SD, how acceptance/rejection thresholds are derived using occupancy-related figures, and how, therefore, the final decision is made whether an utterance is assessed as SD or NSD.

Estimating the probability whether an utterance is system-directed can make use of the number of occupants in the vehicle. In general, people who drive alone are less likely to engage in human-to-human (i.e. NSD) conversation than when they are in the vehicle with one or more other people (or other beings such as pets to whom a driver may talk).

Exceptions where NSD utterances may occur also in the single-occupancy case—such as a driver talking on the phone, talking to person outside of the car, singing, talking to him/herself—can be detected by other means such as audiovisual classifier trained on these situations, Bluetooth connectivity, input on the car's position and motion state, etc. Occupant-specific factors may also affect the classification threshold.

Determining whether a person is alone in the vehicle or with other people has shown to impact whether a person prefers to address the voice assistant by name, i.e. with a wake-up word like "hey [voice assistant name]" (multi-occupancy case) or without the name (single driver case), so the occupancy information can be used to model whether a speaker is addressing the system depending on whether a wake up word is present or not in a command.

Next to understanding how many people are in a vehicle, the system may also benefit from understanding who in particular is in the vehicle, modelling their behavior, and adapting the SD/NSD classification accordingly. The system may for instance recognize—e.g. per facial or voice recognition or per the use of a personal car key—the driver of the car, know that this particular person happens to talk to himself 3× per hour on average when driving alone, and store these statistics in a model of that person so that the classifier estimating whether speech is SD or NSD may use these statistics.

How talkative a particular person is may depend also on with whom he or she is in the car and driving situation such as time of the day, and can be modelled and used for SD/NSD classification accordingly. For instance, a father picking up his daughter after school may find her less talkative when she is in the car alone with him than when she is with her best friend. When they are driving home late at night after a soccer tournament and are tired, they may no longer be very chatty.

These occupancy-related factors then complement the system's SD/NSD probability estimation, next to verbal factors including what the user said, and nonverbal information (e.g. the voice's prosody, gaze information, etc.).

Occupancy also impacts the cost to the user experience that a false-accept (FA)/false-reject (FR) error based on incorrect SD/NSD classification has. A user driving alone in a car may wonder why an FA error of a voice assistant occurs but not be as disturbed by the voice assistant incorrectly engaging with the user as in the multi-occupancy case, where a voice assistant prompt caused by false activation interrupting human-to-human conversation may be perceived as more annoying.

The different cost to the user experience in different situations is modeled by different acceptance/rejection thresholds for the SD classification: if the cost of an FA error (incorrectly causing the voice assistant to engage) is high, the acceptance threshold is set to a relatively high value. If FR errors are more harmful to the user experience (the user is annoyed that the voice assistant cannot be activated), a relatively lower acceptance threshold is selected. Other factors influencing the setting of the SD acceptance threshold may include personal preference of the user (is he/she more frustrated by FA or FR errors) and the user experience design philosophy of the voice assistant.

The factors related to the occupancy o thusly impact both the computation of the probability estimate $p(SD|u, o)$ that an utterance u is system directed, as well as the threshold $tSD(o)$. The system then accepts an utterance as system-directed if $p(SD|u, o)>tSD(o)$.

FIG. 1 illustrates a block diagram for an automotive voice assistant system 100 having a multimodal input processing system in accordance with one embodiment. The automotive voice assistant system 100 may be designed for a vehicle 104 configured to transport passengers. The vehicle 104 may include various types of passenger vehicles, such as crossover utility vehicle (CUV), sport utility vehicle (SUV), truck, recreational vehicle (RV), boat, plane or other mobile machine for transporting people or goods. Further, the vehicle 104 may be autonomous, partially autonomous, self-driving, driverless, or driver-assisted vehicles. The vehicle 104 may be an electric vehicle (EV), such as a battery electric vehicle (BEV), plug-in hybrid electric vehicle (PHEV), hybrid electric vehicle (HEVs), etc.

The vehicle 104 may be configured to include various types of components, processors, and memory, and may communicate with a communication network 110. The communication network 110 may be referred to as a "cloud" and may involve data transfer via wide area and/or local area networks, such as the Internet, Global Positioning System (GPS), cellular networks, Wi-Fi, Bluetooth, etc. The communication network 110 may provide for communication between the vehicle 104 and an external or remote server 112 and/or database 114, as well as other external applications, systems, vehicles, etc. This communication network 110 may provide navigation, music or other audio, program content, marketing content, internet access, speech recognition, cognitive computing, artificial intelligence, to the vehicle 104.

The remote server 112 and the database 114 may include one or more computer hardware processors coupled to one or more computer storage devices for performing steps of one or more methods as described herein and may enable the vehicle 104 to communicate and exchange information and data with systems and subsystems external to the vehicle 104 and local to or onboard the vehicle 104. The vehicle 104 may include one or more processors 106 configured to perform certain instructions, commands and other routines as described herein. Internal vehicle networks 126 may also be included, such as a vehicle controller area network (CAN), an Ethernet network, and a media oriented system transfer (MOST), etc. The internal vehicle networks 126 may allow the processor 106 to communicate with other vehicle 104 systems, such as a vehicle modem, a GPS module and/or Global System for Mobile Communication (GSM) module configured to provide current vehicle location and heading information, and various vehicle electronic control units (ECUs) configured to corporate with the processor 106.

The processor 106 may execute instructions for certain vehicle applications, including navigation, infotainment, climate control, etc. Instructions for the respective vehicle systems may be maintained in a non-volatile manner using a variety of types of computer-readable storage medium 122. The computer-readable storage medium 122 (also referred to herein as memory 122, or storage) includes any non-transitory medium (e.g., a tangible medium) that participates in providing instructions or other data that may be read by the processor 106. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/structured query language (SQL).

The processor 106 may also be part of a multimodal processing system 130. The multimodal processing system 130 may include various vehicle components, such as the processor 106, memories, sensors, input devices, displays, etc. The multimodal processing system 130 may include one or more input and output devices for exchanging data processed by the multimodal processing system 130 with other elements shown in FIG. 1. Certain examples of these processes may include navigation system outputs (e.g., time sensitive directions for a driver), incoming text messages converted to output speech, vehicle status outputs, and the like, e.g., output from a local or onboard storage medium or system. In some embodiments, the multimodal processing system 130 provides input/output control functions with respect to one or more electronic devices, such as a heads-yup-display (HUD), vehicle display, and/or mobile device of the driver or passenger, sensors, cameras, etc. The multimodal processing system 130 includes an error detection system configured to detect improper classification of utterances by using user behavior detected by the vehicle sensors, as described in more detail below.

The vehicle 104 may include a wireless transceiver 134, such as a BLUETOOTH module, a ZIGBEE transceiver, a Wi-Fi transceiver, an IrDA transceiver, a radio frequency identification (RFID) transceiver, etc.) configured to communicate with compatible wireless transceivers of various user devices, as well as with the communication network 110.

The vehicle 104 may include various sensors and input devices as part of the multimodal processing system 130. For example, the vehicle 104 may include at least one microphone 132. The microphone 132 may be configured receive audio signals from within the vehicle cabin, such as acoustic utterances including spoken words, phrases, or commands from a user. The microphone 132 may include an audio input configured to provide audio signal processing features, including amplification, conversions, data processing, etc., to the processor 106. As explained below with respect to FIG. 2, the vehicle 104 may include at least one microphone 132 arranged throughout the vehicle 104. While the microphone 132 is described herein as being used for purposes of the multimodal processing system 130, the microphone 132 may be used for other vehicle features such as active noise cancelation, hands-free interfaces, etc. The microphone 132 may facilitate speech recognition from audio received via the microphone 132 according to grammar associated with available commands, and voice prompt generation. The microphone 132 may include a plurality of microphones 132 arranged throughout the vehicle cabin.

The microphone 132 may be configured to receive audio signals from the vehicle cabin. These audio signals may include occupant utterances, sounds, etc. The processor 106 may receive these audio signals to determine the number of occupants within the vehicle. For example, the processor 106 may detect various voices, via tone, pitch, frequency, etc., and determine that more than one occupant is within the vehicle. Based on the audio signals and the various frequencies, etc., the processor 106 may determine the number of occupants. Based on this the processor 106 may adjust certain thresholds relating to voice assistant utterance detection. This is described in more detail below.

The microphone 132 may also be used to identify an occupant via directly identification (e.g., a spoken name), or by voice recognition performed by the processor 106. The microphone may also be configured to receive non-occupancy related data such as verbal utterances, etc.

The sensors may include at least one camera configured to provide for facial recognition of the occupant(s). The camera may also be configured to detect non-verbal cues as to the driver's behavior such as the direction of the user's gaze, user gestures, etc. The camera may monitor the driver head position, as well as detect any other movement by the user, such as a motion with the user's arms or hands, shaking of the user's head, etc. In the example of a camera, the camera may provide imaging data taken of the user to indicate certain movements made by the user. The camera may be a camera capable of taking still images, as well as video and detecting user head, eye, and body movement. The camera may include multiple cameras and the imaging data may be used for qualitative analysis. For example, the imaging data may be used to determine if the user is looking at a certain location or vehicle display. Additionally or alternatively, the imaging data may also supplement timing information as it relates to the user motions or gestures.

The vehicle 104 may include an audio system having audio playback functionality through vehicle speakers 148 or headphones. The audio playback may include audio from sources such as a vehicle radio, including satellite radio, decoded amplitude modulated (AM) or frequency modulated (FM) radio signals, and audio signals from compact disc (CD) or digital versatile disk (DVD) audio playback, streamed audio from a mobile device, commands from a navigation system, etc.

As explained, the vehicle 104 may include various displays and user interfaces, including HUDs, center console displays, steering wheel buttons, etc. Touch screens may be configured to receive user inputs. Visual displays may be configured to provide visual outputs to the user.

The vehicle 104 may include other sensors such as at least one sensor 152. This sensor 152 may be another sensor in addition to the microphone 132, data provided by which may be used to aid in detecting occupancy, such as pressure sensors within the vehicle seats, door sensors, cameras etc. This occupant data from these sensors may be used in combination with the audio signals to determine the occupancy, including the number of occupants.

While not specifically illustrated herein, the vehicle 104 may include numerous other systems such as GPS systems, human-machine interface (HMI) controls, video systems, etc. The multimodal processing system 130 may use inputs from various vehicle systems, including the speaker 148 and the sensors 152. For example, the multimodal processing system 130 may determine whether an utterance by a user is system-directed (SD) or non-system directed (NSD). SD utterances may be made by a user with the intent to affect an output within the vehicle 104 such as a spoken command of "turn on the music." A NSD utterance may be one spoken during conversation to another occupant, while on the phone, or speaking to a person outside of the vehicle. These NSDs are not intended to affect a vehicle output or system. The NSDs may be human-to-human conversations.

While an automotive system is discussed in detail here, other applications may be appreciated. For example, similar functionally may also be applied to other, non-automotive cases, e.g. for augmented reality or virtual reality cases with smart glasses, phones, eye trackers in living environment, etc. While the terms "user" is used throughout, this term may be interchangeable with others such as speaker, occupant, etc.

Figure 2:
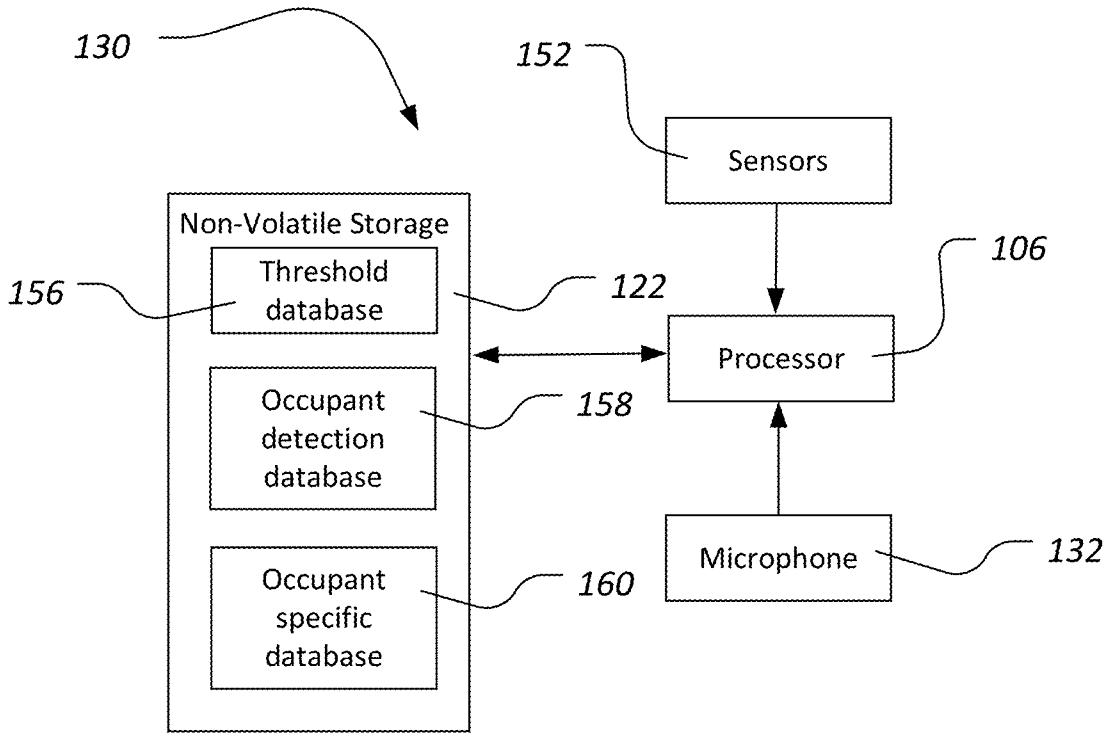
FIG. 2 illustrates an example block diagram of at least a portion of the system of FIG. 1.

FIG. 2 illustrates an example block diagram of a portion of the multimodal processing system 130. In this example block diagram, the processor 106 may be configured to communicate with the microphones 132, sensors 152, and memory 122.

The memory 122 may be configured to maintain various databases. These databases may include databases necessary to determine whether an utterance is SD or NSD. This includes, as explained above, occupancy related characteristics and data, as well as non-occupancy related data. In one example of occupancy related data, the memory 112 may maintained an occupant specific database 160. The occupant specific database 160 may include a list of known occupants and associated occupant data. The occupant data may include characteristics and preferences of that occupant or user, such as how talkative a person is, certain trends based on time of day (e.g., if an occupant is more talkative in the morning or evening, preferences on wake-words, expressed wake word usage for SD indication, or preference to non-wake word SD analysis, etc.

The occupant specific database 160 may maintain identifying data related to individual occupants such as facial recognition, biometric, or voice data. This data may be compared with data received from the sensor 152 to identify the user. The memory 112 may maintain occupant-specific factors including preferences, annoyances, etc., that may be used to establish the classification threshold.

In the event that an occupant is not identified, perhaps the occupant has not been in the user's vehicle before, is a guest, etc., certain default settings and preferences may be provided by the memory 112.

The memory 112 may also include a threshold database 156 that maintains a database of known, though continually learned, thresholds. As explained, the thresholds may be used to determine whether an utterance made by at least one of the occupants is SD or NSD. The thresholds may be classification thresholds used by the multimodal processing system 130 to determine whether an utterance is SD or NSD. This threshold may be based, at least in part, on the number of occupants in the vehicle. In this example, classification threshold the more occupants, the higher the threshold so as to minimize false accepts by the system when occupants are conversing.

In one example, the threshold database 156 may maintain two thresholds, one single-occupant threshold and one multi-occupant threshold. In another example, the database 156 may maintain a threshold associated with each number of occupants or range of occupants. For example, in the case of a single occupant a first classification threshold may be established. For two occupants, a second classification threshold may be established, etc. In another example, a threshold may be associated with a range of occupants where for 2-4 passengers one classification threshold is set, and for 5 or more occupants another threshold is set. These are merely example ranges, and others could be used depending on the vehicle, capacity, etc.

Thus, based on the number of occupants, higher user satisfaction may be achieved with the system such that the false accepts and false rejects are minimized based on the adaptive thresholds.

Further, additionally or alternatively, the thresholds may be set based on occupant preferences, which may depend on several occupancy related data and non-occupancy related data. Certain occupants may have more patience for FA/FRs, while some may not. Some may prefer FAs over FRs. If the cost of an FA error (incorrectly causing the voice assistant to engage) is high, the acceptance threshold may be set to a relatively high value. If FR errors are more harmful to the occupant experience (the occupant is annoyed that the voice assistant cannot be activated), a relatively lower acceptance threshold is selected. That is, factors other than occupancy may affect thresholds.

The occupant detection database 158 within the storage 122 may maintain data indicative of occupancy. For example, the database 158 may include frequencies, pitches, sensor data such as seat data, mobile device, and/or camera data that may indicate the number of occupants. Such known data may be compared to the microphone and other data received from the sensors 152. The processor 106 may compare the received data to known data that indicate a certain presence of a passenger, either by location of a sensor (e.g., seat sensor or camera) and/or a parameter of the audio signals received at the microphone 132 that indicates a occupant. In the event of audible signals, the ability to detect different voices may be used to determine the number of occupants.

Figure 3:
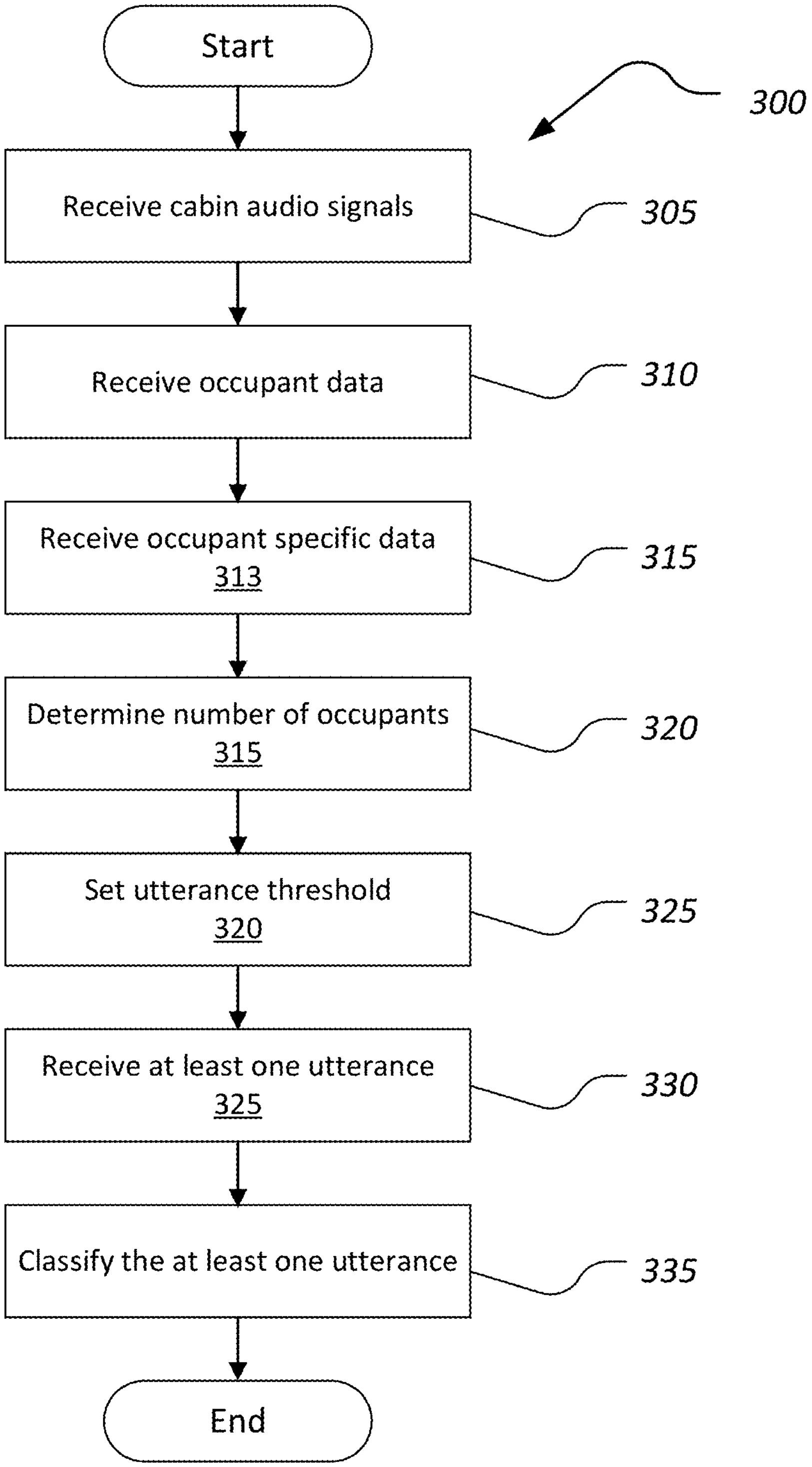
FIG. 3 illustrates an example flow chart for a process for the automotive voice assistant system of FIG. 1.

FIG. 3 illustrates an example flow chart for a process 300 for the automotive voice assistant system 100 of FIG. 1. The process 300 may begin at block 305, where the processor 106 receives audio signals from the microphone 132. The audio signals may include human voice sounds, ambient noise, etc., and intended to indicate a number of occupants in the vehicle. The audio signals may be received over a predefined time span or amount of time. The audio signals may be continually received so as to constantly provide data indicating the audible atmosphere within the vehicle.

At block 310, the processor 106 may receive occupant data from the sensors 152 and/or the microphone 132. As explained above, the occupant data may include, in addition to the audio signals from the vehicle cabin, other data from other sensors that may indicant the presence of one or more occupants.

At block 315, the processor 106 may receive occupant specific data from the occupant specific database 160. This may include data or preferences specific to identified occupants within the vehicle 102. The processor 106 may identify the occupants via the received occupant data from the sensors 152. This may include facial recognition data, voice recognition, etc. Once an occupant is identified as a known occupant, the occupant specific database 160 may be used to look up specific preferences for that user.

At block 320, the processor 106 may determine the number of occupants based on the audio signals and/or the occupant data. This may be done by processing the audio signals and/or the occupant data for cues that an occupant is present in the vehicle, difference in audible sounds in the audio signals, etc. Data form the occupant detection database 158 may be used to make this determination.

At block 325, the processor 106 may determine a classification threshold. This threshold may be determined based on several factors. Occupancy related data such as the number of occupants, specific occupant preferences, etc., may be used to set the threshold. In one example, a higher number of occupants may mean a higher threshold. However, when paired with occupant-specific factors or preferences for disliking false rejects, the threshold may in turn be lowered. Thus, various factors may affect the determined thresholds.

Further, as explained above threshold database 156 may maintain two thresholds, one single-occupant threshold and one multi-occupant threshold. In another example, the database 156 may maintain a threshold associated with each number of occupants or range of occupants.

At block 330, the processor 106 may receive an utterance spoken by one of the vehicle occupants.

At block 335, the processor 106 may classify the utterance based, at least in part, on the selected threshold. The selected threshold may be appropriate and associated with the number of occupants to avoid confusing SD utterance with conversation between occupants. As explained above, factors related to the occupancy o impact both the computation of the probability estimate p(SD|u, o) that an utterance u is system directed, as well as the threshold tSD(o). The S/NSD classifier estimates the probability p that he utterance u is SD. The threshold/is determined based on occupancy, among other factors. If the probability p is greater than the threshold t, then the system determines that the utterance u is SD. Otherwise, the utterance u is classified as NSD.

Notably, the processor 106 may determine whether the utterance is SD or NSD based on characteristics of the utterance, such as the tone, direction, occupant position within the vehicle, the specific occupant based on voice recognition, etc. Signal processing techniques including filtering, noise cancelation, amplification, beamforming, to name a few, may be implemented to process the utterance. In some instances, the tone of the utterance alone may be used to classify the utterance as SD or NSD.

Accordingly, described herein is a system configured to determine whether an utterance is SD or NSD based, at least in part, on at least one threshold associated that may vary based on occupancy factors, such as individual preferences and number of occupants in a vehicle.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (erasable programmable read-only memory (EPROM) or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable.

The flowcharts and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle system for classifying spoken utterance within a vehicle cabin as one of system-directed and non-system directed, the system comprising:
- at least one microphone configured to detect at least one audio signal from at least one occupant of a vehicle; and
- a processor programmed to:
  - receive the at least one audio signal including at least one acoustic utterance,
  - determine a number of vehicle occupants based at least in part on the at least one audio signal,
  - determine a probability that the at least one acoustic utterance is system directed based at least in part one the at least one acoustic utterance and the number of vehicle occupants,
  - determine a classification threshold based at least in part on the number of vehicle occupants, and
  - compare the classification threshold to the probability to determine whether the at least one acoustic utterance is one of a system directed utterance and a non-system directed utterance.

2. The system of claim 1, wherein the processor is further programmed to receive occupant data from at least one sensor, the occupant data indicative of a presence of an occupant.

3. The system of claim 2, wherein the processor is further programmed to determine the number of occupants based at least in part on the occupant data.

4. The system of claim 1, wherein the classification threshold increases as the number of occupants increases and decreases as the number of occupants decreases.

5. The system of claim 1, wherein at least one of the classification threshold and probability is based at least in part on the number of vehicle occupants and at least one occupant-specific factor.

6. The system of claim 1, wherein the processor is programmed to determine that the at least one acoustic utterance is system directed in response to the probability exceeding the classification threshold.

7. A vehicle system for classifying spoken utterance within a vehicle cabin as one of system-directed and non-system directed, the system comprising:
- at least one sensor configured to detect at least one occupancy signal from at least one occupant of a vehicle, wherein the occupancy signal is indicative of a presence of an occupant; and
- a processor programmed to:
  - receive at least one audio signal from a vehicle microphone, and
  - determine a number of occupants based at least in part on the occupancy signal;
- determine a classification threshold based at least in part on the number of occupants to apply to a probability that acoustic utterances spoken by at least one of the vehicle occupants is a system directed utterance.

8. The system of claim 7, wherein the classification threshold is based at least in part on at least one occupant-specific factor.

9. The system of claim 8, wherein at least one occupant-specific factor includes a personal preference associated with the at least one occupant.

10. The system of claim 7, wherein the classification threshold increases as the number of occupants increases and decreases as the number of occupants decreases.

11. The system of claim 7, wherein the processor is further programmed to compare the classification threshold to the probability to determine whether the at least one acoustic utterance is one of a system directed utterance and a non-system directed utterance.

12. The system of claim 11, wherein the processor is programmed to determine that the utterance is system directed in response to the probability exceeding the classification threshold.

13. A method for classifying spoken utterance as one of system-directed and non-system directed, the method comprising:
- receiving at least one signal indicative of a number of vehicle occupants,
- receiving at least one utterance from one of the vehicle occupants;
- identifying the one of the vehicle occupants;
- determining a probability that the at least one utterance is system directed; and
- determining a classification threshold based at least in part on the number of vehicle occupants and occupant-specific factors associated with the one of the vehicle occupants; and
- comparing the classification threshold to the probability to determine whether the at least one utterance is one of a system directed utterance and a non-system directed utterance.

14. The method of claim 13, wherein the classification threshold increases as the number of occupants increases and decreases as the number of occupants decreases.

15. The method of claim 13, wherein the utterance is system directed in response to the probability exceeding the classification threshold.

16. The method of claim 13, wherein the utterance is received as part of an audio signal detected by at least one vehicle microphone.

17. The method of claim 13, wherein the at least one signal indicative of a number of vehicle occupants is received from at least one sensor configured to detect at least one occupancy signal from the at least one occupant of a vehicle.

18. The method of claim 17, wherein the classification threshold is determined based at least on part on additional factors, including at least one of a personal preference associated with the at least one occupant.

* * * * *